Aug. 25, 1959  H. E. ENGLESON ET AL  2,901,084
CONVEYER TRANSFER MECHANISMS
Filed March 20, 1956  4 Sheets-Sheet 1
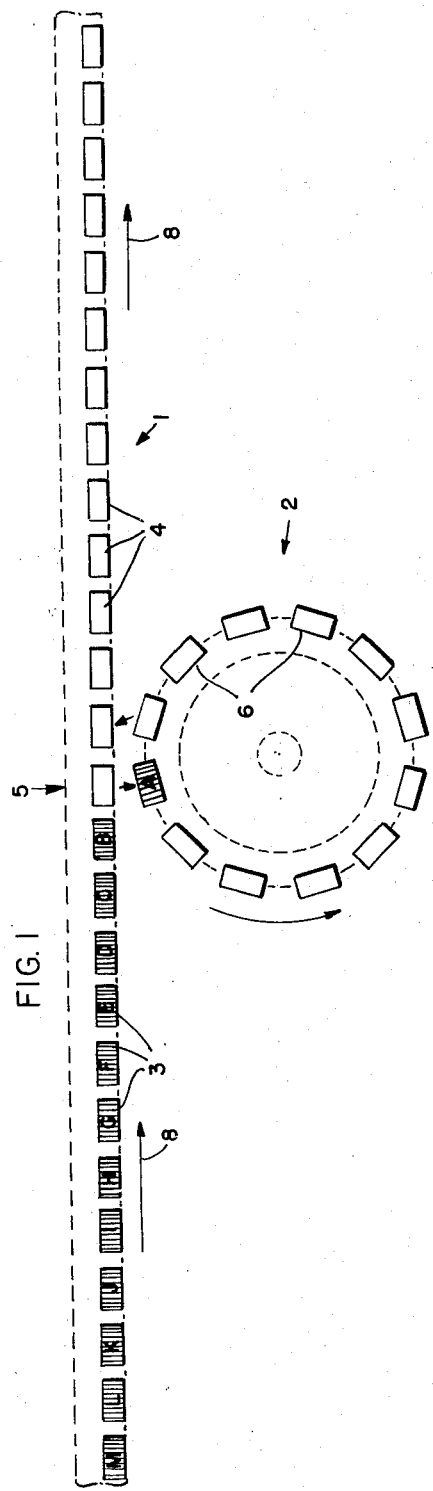
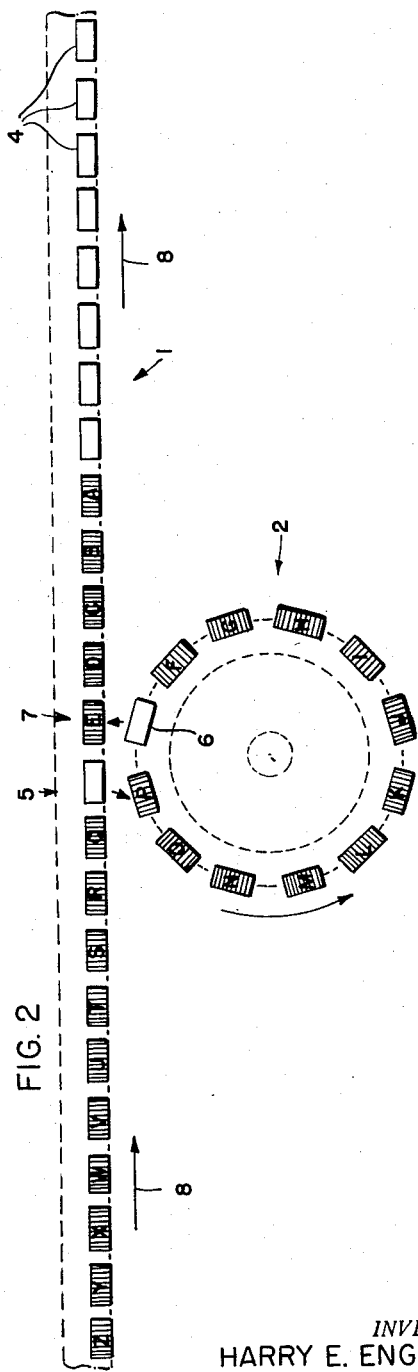
INVENTORS:
HARRY E. ENGLESON
ELMER D. SRAMEK
BY *Marzall Johnston, Cook & Root*
ATT'YS Aug. 25, 1959   H. E. ENGLESON ET AL   2,901,084
CONVEYER TRANSFER MECHANISMS
Filed March 20, 1956   4 Sheets-Sheet 2

INVENTORS:
HARRY E. ENGLESON
ELMER D. SRAMEK

BY Marzall, Johnston, Cook & Root.
ATT'YS

INVENTOR.
HARRY E. ENGLESON
ELMER D. SRAMEK

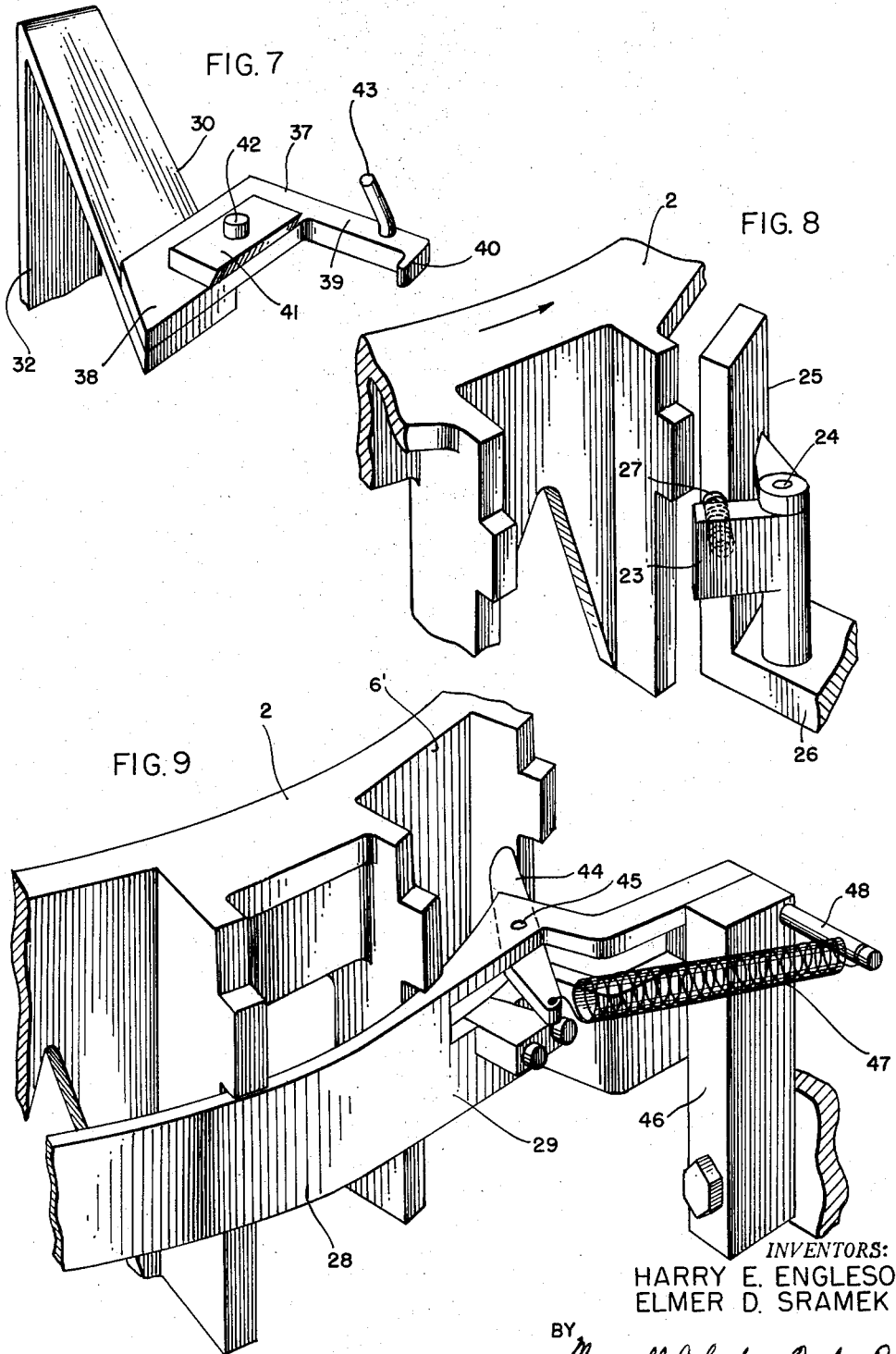

United States Patent Office 2,901,084
Patented Aug. 25, 1959

2,901,084
CONVEYER TRANSFER MECHANISMS

Harry E. Engleson, Chicago, and Elmer D. Sramek, Cicero, Ill., assignors to F. B. Redington Co., Bellwood, Ill., a corporation of Delaware Application March 20, 1956, Serial No. 572,765

10 Claims. (Cl. 198—24)

This invention relates to machinery for transporting articles such as boxes and the like, and more particularly to such machinery having conveyers with especially adapted pockets, usually termed "buckets," for carrying cardboard cartons.

A conveyer arrangement of the invention is particularly useful in carrying cardboard cartons, or the like, in spaced relation with associated machinery for filling the carton with material which is to be prepared and packaged for sale to the public. In certain applications, it is desirable to carry the cartons at a steady, continuous rate, and in other applications where operations are to be performed upon the carton, it is desirable that the carton stop or dwell between intermittent movements.

It is an object of this invention to provide conveyer mechanism having buckets moving continuously in a straight line cooperating with other buckets moving intermittently around a closed path. Cartons moving along the straight continuously moving conveyer is adapted to be transferred to the intermittently moving conveyer, whereupon certain mechanical operations may be performed. The cartons then may be retransferred back to the same continuously moving straight conveyer for further operations, thereby gaining the advantages of both the continuously moving conveyer and the intermittently moving conveyer.

A further object of this invention is to provide a pair of conveyers for moving cartons in spaced relation with machinery for performing operations thereon; one conveyer may be straight extending from a source of cartons to an ultimate discharge point for the packaged material, and the other conveyer may be circular and located adjacent to the straight conveyer at an intermittent point. Cartons may be removed from the straight conveyer, passed around the circular conveyer and thence returned to the straight conveyer, thereby permitting the associated machinery for performing intermediate operations on the cartons to be arranged compactly, thus minimizing the floor space required by the packaging machine.

Another object of this invention is to provide a transfer mechanism for intercepting cartons moving from the continuously moving conveyer and for placing the cartons on the intermittently moving conveyer; the transfer mechanism may employ a parallel arm arrangement supported and carried by a pair of synchronously moving support gears.

A further object is to provide another transfer mechanism for removing the cartons from the intermittently moving conveyer and to seat said cartons in the buckets of the continuously moving conveyer; this transfer mechanism may include a pair of members pivotally mounted and reciprocating between the conveyers.

A still further object of the invention consists in the provision of a straight line conveyer movable in a predetermined direction, there being a circular conveying mechanism to which the articles from which the straight line conveyer are received, whereby the articles are transferred to the circular conveyer and movable in a direction opposite to the directional movement of the straight line conveyer, there being means employed for reinserting the articles from the circular conveyer back into the original conveyer and in the same direction as the first directional movement of the first conveyer.

A more complete understanding of the present invention, its mode of operation and its advantages, may be gathered from further reading of this specification, together with an inspection of the accompanying drawings in which:

Figs. 1 and 2 are similar schematic diagrams of the conveyer arrangement of this invention illustrating the positioning and movement of cartons thereon, Fig. 2 illustrating the positioning of the cartons at a time subsequent to that of Fig. 1;

Fig. 7 is a fragmentary perspective view of the arm for intercepting cartons from the intermittently moving conveyer and for transferring them to the continuously moving conveyer;

Fig. 8 is a fragmentary perspective view of a carton receiving pocket on the intermittently moving circular conveyer together with a carton guide; and Fig. 9 is a fragmentary perspective view of a portion of the circular conveyer together with a carton guide cooperating with the second transfer mechanism.

Figure 3:
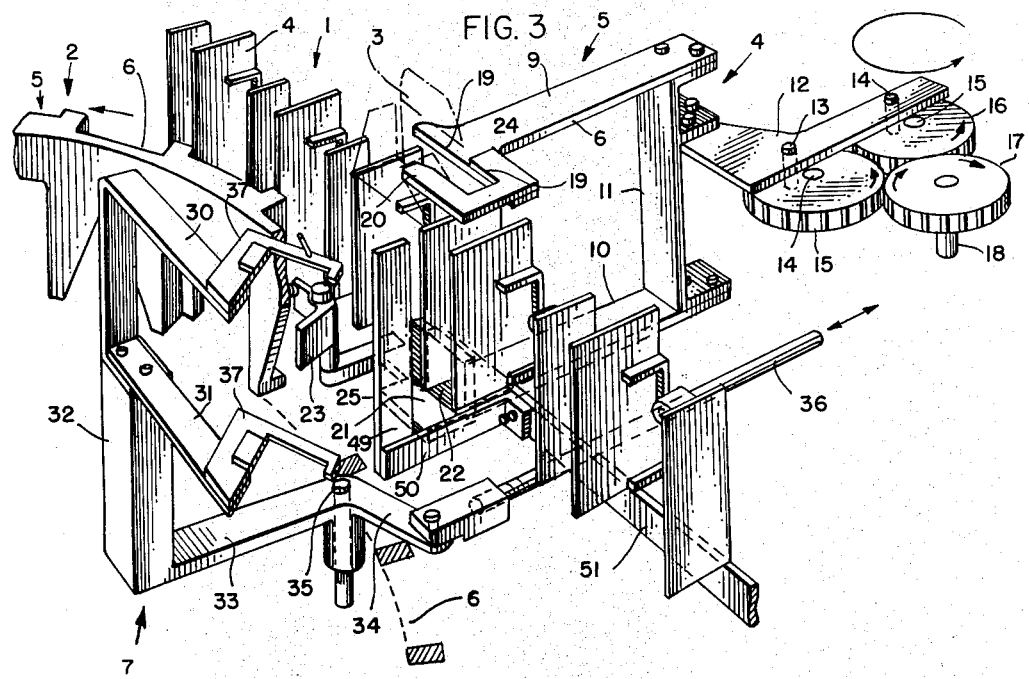
Fig. 3 is a perspective view of a part of the packaging machine of the invention, particularly showing portions of the continuously moving straight conveyer and the intermittently moving circular conveyer together with the mechanism for transferring cardboard cartons from one conveyer to the other, and vice versa.

The packaging machine particularly illustrated by the drawings comprises generally a continuously moving straight conveyer 1 and an intermittently moving circular conveyer 2. The cardboard cartons 3 are initially expanded and positioned within buckets 4 at a beginning point of the conveyer 1 which may be at the left end, as illustrated in Figs. 1 and 2.

The apparatus for expanding the cartons for seating them in the buckets 4, and for tilting them to an upright position, is described and illustrated in applicants' Patent No. 2,864,288, issued on December 16, 1958, entitled "Carton Expanding and Transfer Mechanism."

The cartons appearing on the conveyer 1 are held by the sides of the buckets 4 which are spring-urged together, thus engaging and holding the cartons from opposite sides thereof.

When the cartons moving along the conveyer 1 reach a transfer point 5, they are removed from the conveyer 1 and placed within pockets 6 on the intermittently moving circular conveyer 2. Fig. 1 illustrates the progression of the cartons along the conveyers wherein carton A is indicated to be the first in a sequence followed by carton B, carton C, etc. In Fig. 1, the first carton A has progressed to the transfer point 5 and has been thence transferred to the first position of the circular conveyer 2. Fig. 2 corresponds to a time subsequent when the initial carton A has proceeded counterclockwise by intermittent movements around the circular conveyer 2 to a second transfer point 7, has been returned to the straight conveyer 1, and is continuing to the right, as indicated by the arrows 8. In Fig. 1 it is assumed that the buckets or pockets of both conveyers proceeding ahead of carton A are empty. Fig. 2 illustrates many more cartons on the conveyers and, at the particular time illustrated by Fig. 2, a carton E has just been transferred at the transfer point 7 to the original straight conveyer and, simultaneously, a carton P has been transferred at the transfer point 5 to the circular conveyer 2. Thus, on each conveyer a single pocket appears empty at one of the transfer points 5 and 7.

The operations performed upon the cartons as they move around the circular conveyer 2 are described and illustrated in the copending patent application of the present inventors entitled "Bag Forming and Inserting Mechanism," Serial No. 549,380 filed November 28, 1955; and these operations comprise generally the forming of a bag container and the inserting of this bag container into the cartons 3. The cartons 3, as they are returned to the straight conveyer 1 at the transfer point 7, thus contain an inner liner or bag which remains open at the top in position for filling with a granular material, or other substance, to be packaged for public sale.

The transfer mechanisms are shown in perspective by Fig. 3 wherein the straight conveyer 1 is adapted to move continuously toward the lower right end wherein the circular conveyer 2 moves counterclockwise. The first transfer mechanism includes a pair of horizontal arms 9 and 10 spaced vertically, one above the other, and rigidly connected and supported by a vertical bracket or casting 11. A horizontal member 12 supports the bracket 11 and, in turn, is supported on two crank pins 13 and 14 extending upwardly from a pair of gears 15 and 16. The gears 15 and 16 have the same number of teeth and are driven by a common gear 17 from a power shaft 18. Thus, the gears 15 and 16 will rotate synchronously with each other and may be coupled to a main drive shaft (not shown) of the machine such that the operation of the transfer mechanisms 5 will be synchronously timed with respect to the motion of the conveyers 1 and 2. The crank pins 13 and 14 are similarly positioned on the gears 15 and 16 and thus the arm 12 and the upper and lower transfer arms 9 and 10 move with a parallel circular motion. The left end of the upper transfer arm 9 (as seen in Figs. 3, 4, 5 and 6) is generally hook-shaped containing a straight abutting surface 19 extending longitudinally with the conveyer. A hooked finger 20 integral with the arm 9 extends parallel to the abutting surface 19 and is positioned above the buckets 4 to engage and depress a side flap of the carton 3 which will be bent downwardly beneath the finger 20, as indicated by the dashed lines in Fig. 3. The left end of the lower transfer arm 10 (as seen in Fig. 3) contains a horizontal ledge 21 positioned to slide beneath carton 3 in the bucket 4. A vertically extending surface 22 is positioned to abut against a lower part of the carton 3. Thus, as the two transfer arms 9 and 10 intercept a carton on the conveyer 1, the upper hooked part turns down a side flap while permitting a rear top flap to extend upwardly in the slot formed between the finger 20 and the abutting surface 19. Simultaneously, the lower corner of the carton becomes seated on the ledge part 21 in front of the abutting surface 22. By turning the top flap downwardly beneath the finger 20, the natural resilience of the cardboard carton tending to spring the flap back to a vertical position, serves to seat the carton securely on the ledge part 21 of the lower arm 10. Thus, the carton seats firmly between the ledge 21 at the bottom and the finger part 20 depressing the flap at the top. As the carton seats on the two arms 9 and 10 of the transfer mechanism, the gears 15 and 16 carry the crank pins 13 and 14 to the left, Figs. 4, 5 and 6, and the arms 9 and 10, with their abutting surfaces 19 and 22, carry the carton transversely out of the conveyer bucket 4 and press it into a pocket 6 of the circular conveyor 2, as shown in Fig. 5. When the carton is pressed into the pockets 6, the circular conveyer 2 remains in a rest or dwell position between the intermittent movements thereof.

A yieldable member or guide 23 is supported to pivot about a vertical axis 24 (see Fig. 8). The pivotal axis 24 of the guide member 23 is secured to an upstanding fixed frame part 25 and to a fixed horizontal support 26. A compression spring 27 is positioned between the fixed part 25 and the pivotal guide 23 for urging the guide outwardly away from the part 25. As the transfer arms 9 and 10 move from the straight conveyer 1 to the circular conveyer 2 (from the position shown by Fig. 4 to the position shown by Fig. 5), a side of the cardboard carton engages the pivotal guide 23 which exerts force thereon and retains the carton against the transfer member such that the carton 3 will remain firmly held by the transfer arms 9 and 10.

After the carton is seated within the pockets 6 of the circular conveyer, as shown in Fig. 5, the circular conveyer 2 moves in a counter-clockwise direction to the next rest or dwell position and the transfer arms 9 and 10 sweep away from the carton in a circular motion due to the rotation of the gears 15 and 16. The carton seated in the pocket may move with the conveyer without interference from the pivotal guide 23 and without interference from the hooked finger 20 on the transfer arm 9, since the arm is withdrawn rearwardly releasing the carton naturally from the grooved slot between the finger 20 and the abutting surface 19. The cartons moving in the circular conveyer 2 are held therein by a band 28 which encircles the conveyer from the rigid support 25 continuing around the conveyer and terminating with a second rigid support 29 forming a part of the second transfer mechanism 7.

After release of the cardboard carton, the transfer arms 9 and 10 continue to move in a parallel circular motion determined by the two synchronously rotating gears 15 and 16 and continuing until the next succeeding carton 3 is intercepted from the next succeeding bucket 4 of the conveyer 1, whereupon another transfer operation occurs.

The mechanism for transferring cartons from the circular conveyer to the straight conveyer comprises a pair of vertically spaced arms 30 and 31 supported on a common vertical member 32 which is integral with a bell crank having horizontal arms 33 and 34. The bell crank 33—34 is mounted to pivot about an axis 35. The second transfer member is driven by a push-pull link 36 pivotally connected to the arm 34 of the bell crank and driven in synchronism with the conveyers 1 and 2.

A jaw member 37 is fixed to the extremities of each horizontal transfer arm 30 and 31. The jaw member 37 includes a leg 38 fixed to each horizontal arm 30 and 31 which has an abutting part for engaging a side of the cardboard cartons 3 and an L-shaped part 39 extending generally at right angles to the part 38 (see Fig. 7). At the extremity of the L-shaped part 39, a hooked part 40 is adapted to engage an edge of the carton. A pad of resilient material such as rubber 41 is mounted to the jaw 37 by means such as a machine screw 42. Thus, when a carton is received by the jaw 37, the opposed faces thereof are held between the hooked part 40 and the lateral part 38 having an abutting surface with a resilient rubber pad for retaining the carton therein. An upstanding stud 43 is mounted on the upper L-shaped arm 39 and is curved obliquely inwardly to engage the flap of a carton and bend it inwardly somewhat, in which position the flap will not interfere with other parts of the machine such as the end of the transfer arm 9 from the first mechanism. The sequence of operation of the second transfer mechanism is likewise shown progressively by Figs. 4, 5 and 6.

Figure 4:
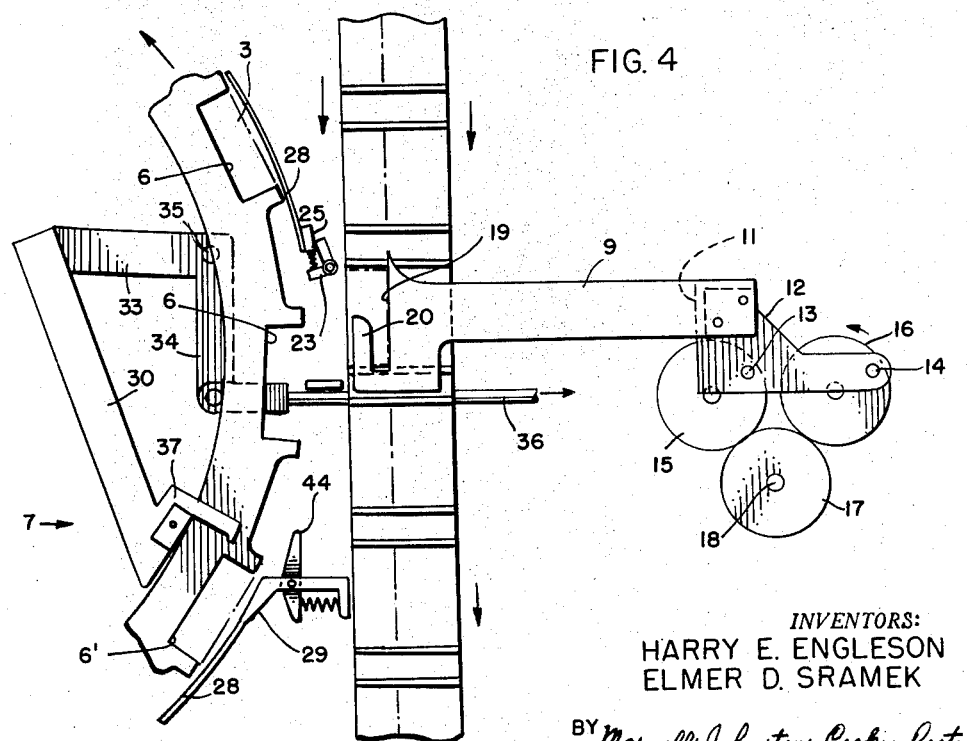
Figs. 4, 5 and 6 are similar plan views of the mechanism shown perspectively in Figs. 1 and 2, showing the carton transferring operations in successive intervals of time.
Figure 5:
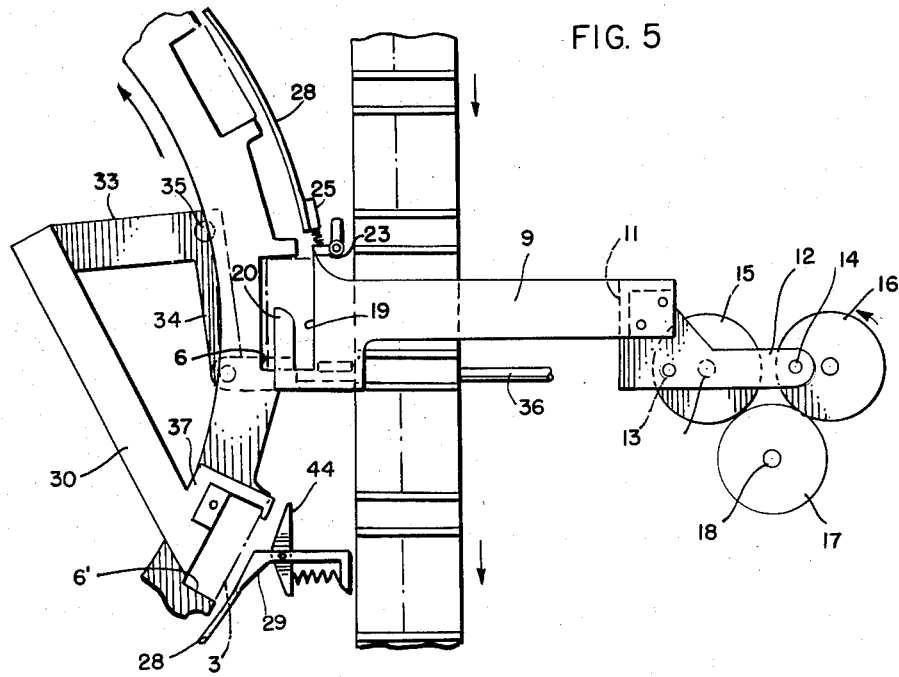
Figure 6:
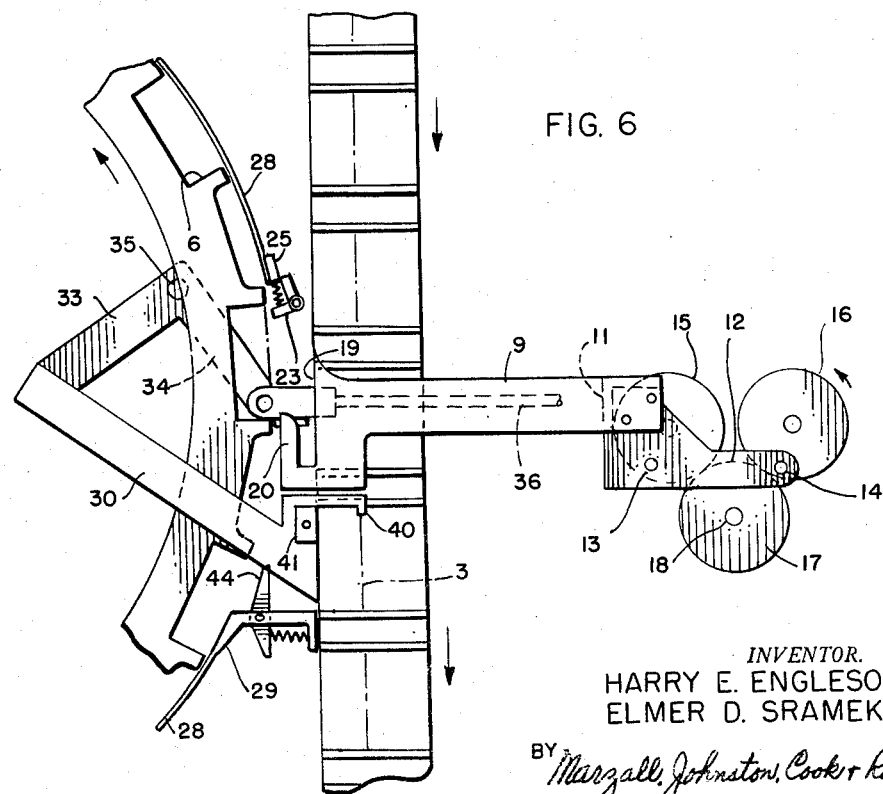

In Fig. 4, the conveyer 2 is moving counter-clockwise and the pocket 6' carries a carton about to be transferred to the conveyer 1. The transfer arm 30, carrying the jaw part 37, is swinging into position to receive the carton from the pocket 6' as the link 36 is being pulled to the right, Fig. 4.

Fig. 5 illustrates the positioning of the conveyer 2 as it rests or dwells between intermittent movements. The carton 3 lodges in the jaw part 37. While the conveyer remains at rest, the carton 3 is pressed outwardly therefrom by the transfer arm 30 and the jaw 37 and moved to a position within a bucket 4 of the conveyer 1. The forward motion of the conveyer 1 will then disengage the carton from the jaw 37 against the retaining power of the hooked part 40 and the resilient material 41.

As the carton is removed from the pocket 6' of the conveyer 2, an edge thereof engages a surface of a spring-urged dog 44 which constitutes a yieldable member for applying force against the carton and holding it within the jaw 37 of the transfer arm 30. The operation of the dog 44 may be understood by reference to Fig. 9. The dog 44 is pivotally mounted about an axis 45 on the fixed support 29 which is supported by a bracket 46 to a part of the frame of the machine. A tension spring 47 is coupled between a rearwardly extending part or arm of the dog 44 and a stud 48 mounted on the bracket 46. As a carton 3 is carried by the transfer arms 30 and 31, the yieldable dog 44 engages and presses the carton firmly into the upper and lower jaws 37. The dog 44 pivots as the carton is carried across the gap between the conveyers and thus continues to exert force on the carton as it yields thereto.

The continuously moving straight line conveyer 1 has a side adapted to be operated to opened and closed position when the carton is removed from it and transferred into the wheel and from the wheel into the pocket of the straight line conveyer. The side of the pocket is under spring tension and is opened when the carton is removed from it and placed into the wheel. When the carton is discharged from the wheel, and placed back into the straight line continuously moving conveyer 1, the pocket or operating wall thereof is again opened to receive the carton. After the carton has been pushed into the pocket, the pocket again clamps the carton by the spring pressed side wall.

A vertical divider guard 49 is mounted on a horizontal bracket 50 which is, in turn, supported from a stationary rail 51 forming a part of the conveyer 1, Fig. 3. The divider 49 assures a separation between the activities of the first transfer mechanism 5 and the second tranfer mechanism 7. If either transfer mechanism malfunctions such that a carton 3 runs afoul, and fails to follow its proper path, the divider 49 will prevent that carton from fouling the action of the other transfer mechanism.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A conveyor system for a packaging machine comprising a first conveyer having a continuously movable line of buckets having open sides for carrying cartons, said first conveyer extending past a first transfer point and a second transfer point, an intermittently movable conveyer having buckets with open sides for carrying the cartons about a closed path from the first transfer point to the second transfer point, a first transfer mechanism operatively associated with both conveyers at the first transfer point, said first transfer mechanism being operable to transfer each carton from a bucket of the first conveyer to a bucket of the second conveyer, and a second transfer mechanism operatively associated with both conveyers at the second transfer point, said second transfer mechanism being operable to transfer each carton from a bucket of the second conveyer to a bucket of the first conveyer each of said transfer mechanisms comprising means for engaging and holding each carton, said means being moved to a position for receiving cartons from a bucket in one of the conveyers and thence being moved to carry the carton to a bucket in the other conveyer.

2. A conveyer system for a packaging machine comprising a straight conveyer having a plurality of buckets for carrying cartons with continuous motion, a circular conveyer having a plurality of buckets for carrying the cartons with intermittent motion, a first transfer mechanism operatively associated with both conveyers for transferring the cartons along a circular path from buckets of the straight conveyer to buckets of the circular conveyer, and a second transfer mechanism for transferring the cartons along a circular path from buckets of the circular conveyer to buckets of the straight conveyer, each of said transfer mechanisms comprising an upper arm and a lower arm movably supported in vertical spaced relation with each other, the upper arm being adapted to engage and hold the top of each carton and the lower arm being adapted to engage and hold the bottom of each carton, said arms being moved to a position for receiving cartons from a bucket in one of the conveyers and thence being moved to carry the carton to a bucket in the other conveyer.

3. A conveyer system for a packaging machine comprising a straight conveyer for carrying cartons with continuous motion, a circular conveyer for carrying the cartons with intermittent motion, a first transfer mechanism operatively associated with both conveyers for transferring the cartons from the straight conveyer to the circular conveyer, and a second transfer mechanism for transferring the cartons from the circular conveyer to the straight conveyer, each of said transfer mechanisms comprising an upper arm for holding the top of each carton, a lower arm for holding the bottom of each carton, both arms being supported in vertical spaced relation to receive a carton and being movable from one conveyer to the other, and a yieldable member adapted to engage and exert force against a carton for retaining the carton firmly seated on the arms of each transfer member.

4. In a packaging machine having a first conveyer and a second conveyer, a mechanism for transferring cartons from the first conveyer to the second conveyer, said transfer mechanism comprising a pair of gears mounted to rotate about parallel vertical axes, means drivingly coupled to both gears for rotating the gears synchronously with each other, each gear having an upstanding crank pin fixed thereto, a support arm pivotally mounted on both crank pins whereby the support arm will sweep in a parallel movement in a horizontal plane as the gears rotate, an upper transfer member, a lower transfer member, a rigid support means holding the upper transfer member and the lower transfer member in vertical spaced relation with each other and holding both members rigidly to the support arm, means on said lower transfer member for supportingly and abuttingly engaging the bottom of a carton from the first conveyor, and means on said upper transfer arm for abutting against the top of the carton and for resiliently depressing a flap of the carton, said transfer members moving with the rotation of the gears to carry a carton from the first conveyor to the second conveyer.

5. In a packaging machine having a first conveyor and a second conveyer, a mechanism for transferring cartons from the first conveyer to the second conveyer, said transfer mechanism comprising a pair of gears mounted to rotate about parallel vertical axes, means drivingly coupled to both gears for rotating the gears synchronously with each other, each gear having an upstanding crank pin fixed thereto, a support arm pivotally mounted on both crank pins whereby the support arm will sweep in a parallel movement in a horizontal plane as the gears rotate, an upper transfer member, a lower transfer member and a rigid support means holding the upper transfer member and the lower transfer member in vertical spaced relation with each other and holding both members rigidly to the support arm, said lower transfer member having a horizontal ledge for supporting the bottom of a carton from the first conveyer and having a vertical surface for abutting against the bottom of the carton, said upper transfer arm having a vertical surface for abutting against the top of the carton and having a hooked part engaging and resiliently depressing a flap of the carton and thereby securing the carton between the upper member and the lower member for transferring said carton from the first conveyer to the second conveyer.

6. In a packaging machine, a mechanism for transferring cartons from an intermittently movable conveyer to a continuously movable conveyor, said mechanism comprising an upper transfer arm, a lower transfer arm, means supporting said transfer arms in vertical spaced relation with each other, said supporting means being mounted to pivot about a vertical axis on the side of the intermittent conveyer remote from the continuous conveyer, said transfer arms having means for engaging and carrying cartons, said transfer arms being movable about the pivot axis to a position for receiving a carton from the intermittent conveyer and being further movable to carry the carton from the intermittent conveyer to a bucket of the continuous conveyer, and a yieldable means positioned to engage and exert force against the carton as it is being carried from the intermittently movable conveyer, said yieldable means being operable to retain the carton in the engaging and carrying means on the transfer arms.

7. In a packaging machine, a mechanism for transferring cartons from an intermittently movable conveyer to a continuously movable conveyor, said mechanism comprising an upper transfer arm, a lower transfer arm, means supporting said transfer arms in vertical spaced relation with each other, said supporting means being mounted to pivot about a vertical axis on the side of the intermittent conveyer remote from the continuous conveyer, each of said transfer arms having a carton receiving jaw including a carton abutting surface, an L-shaped part extending from the abutting surface and a hooked part extending from the L-shaped part, said transfer arms being movable about the pivot axis to a position for receiving a carton in the jaws thereof from the intermittent conveyer and being further movable to carry the carton from the intermittent conveyer to a bucket of the continuous conveyer, and a yieldable finger positioned to engage a carton being carried in the jaws of the transfer arm, said yieldable finger being operable to exert a force on the carton, thereby retaining the carton in the jaws of the transfer arms.

8. A conveyer system for a packaging machine comprising a straight continuously movable conveyer having buckets for carrying cartons, a circular intermittently movable conveyer having pockets for carrying the cartons, a first transfer mechanism operatively associated with both conveyers for transferring the cartons from the buckets of the straight conveyer to the pockets of the circular conveyer, and a second transfer mechanism fo transferring the cartons from the pockets of the circular conveyer to the buckets of the straight conveyer, said first transfer mechanism including a pair of gears mounted to rotate about parallel vertical axes, means drivingly coupled to both gears for rotating the gears synchronously with each other, each gear having an upstanding crank pin, a support arm pivotally mounted on both crank pins whereby the support arm will sweep in a parallel movement as the gears rotate, an upper transfer member having means for receiving and holding the top of a carton, a lower transfer member having means for receiving and holding the bottom of the carton, means rigidly supporting said transfer members in vertical spaced relation with each other and holding both members rigidly to the support arm, said transfer members being movable from the parallel sweep of the support arm into a position for receiving a carton from a bucket of the straight conveyer and thence carrying the carton to a pocket on the circular conveyer.

9. A conveyer system in accordance with claim 7, wherein a yieldable member is positioned to engage a carton being carried by the first transfer mechanism, said yieldable member being mounted to pivot about a vertical axis, and a spring for urging the yieldable member against the carton, thereby securing the carton against the transfer members.

10. A conveyer system for a packaging machine comprising a straight continuously movable conveyer having buckets for carrying cartons, a circular intermittently movable conveyer having pockets for carrying the cartons, a first transfer mechanism operatively associated with both conveyers for transferring the cartons from the buckets of the straight conveyer to the pockets of the circular conveyer, and a second transfer mechanism for transferring the cartons from the pockets of the circular conveyer to the buckets of the straight conveyer, said second transfer mechanism including an upper transfer arm for receiving and holding the top of a carton, a lower transfer arm for receiving and holding the bottom of a carton, supporting means rigidly holding the transfer arms in vertical spaced relation with each other, said supporting means being mounted to pivot about a vertical axis, each of said transfer arms terminating in a jaw adapted to hold the carton, and a yieldable finger positioned to engage and exert force against the carton as the transfer arms move the carton from a pocket of the circular conveyer, said yieldable finger being operable to secure the carton within the jaws of the transfer arms.

References Cited in the file of this patent

UNITED STATES PATENTS

| | | |
|---|---|---|
| 2,542,090 | Lorenz | Feb. 20, 1951 |
| 2,570,956 | Kronquest | Oct. 9, 1951 |
| 2,625,254 | Piazze | Jan. 13, 1953 |
| 2,631,769 | Everett | Mar. 17, 1953 |
| 2,651,442 | Malhiot | Sept. 8, 1953 |